(12) United States Patent
Mekid et al.

(10) Patent No.: US 8,540,468 B2
(45) Date of Patent: Sep. 24, 2013

(54) SMART LID FOR SMART BOLTS AND PROBES

(75) Inventors: Samir Mekid, Dhahran (SA); Abdelhafid Bouhraoua, Dhahran (SA); Uthman Baroudi, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 199 days.

(21) Appl. No.: 13/231,821

(22) Filed: Sep. 13, 2011

(65) Prior Publication Data

US 2013/0064622 A1 Mar. 14, 2013

(51) Int. Cl.
*F16B 31/02* (2006.01)

(52) U.S. Cl.
USPC .............. 411/13; 411/372.5; 411/8; 73/761

(58) Field of Classification Search
USPC .......... 411/387.1, 387.2, 387.3, 387.4, 387.5, 411/387.6, 387.7, 387.8, 8, 9, 14, 372.5; 73/761, 762, 781
See application file for complete search history.

(56) References Cited

U.S. PATENT DOCUMENTS

| | | | | |
|---|---|---|---|---|
| 3,799,108 A | * | 3/1974 | Mosow | 411/13 |
| 3,987,699 A | * | 10/1976 | Popenoe | 411/13 |
| 4,553,124 A | * | 11/1985 | Malicki | 338/5 |
| 4,904,132 A | * | 2/1990 | Popenoe | 411/13 |
| 5,280,967 A | | 1/1994 | Varrin | |
| 6,425,718 B1 | | 7/2002 | Herr et al. | |
| 6,609,865 B2 | | 8/2003 | Daigneault | |
| 6,791,465 B2 | * | 9/2004 | Blagin et al. | 340/665 |
| 6,843,628 B1 | * | 1/2005 | Hoffmeister et al. | 411/14 |
| 7,246,980 B2 | * | 7/2007 | Azzalin et al. | 411/396 |
| 7,293,466 B2 | | 11/2007 | Ohta et al. | |
| 7,350,420 B2 | * | 4/2008 | Burmann | 73/761 |
| 7,649,469 B2 | | 1/2010 | Smith et al. | |
| 2006/0198713 A1 | * | 9/2006 | Azzalin et al. | 411/8 |

FOREIGN PATENT DOCUMENTS

JP 2002202213 A 7/2002

* cited by examiner

*Primary Examiner* — Gary Estremsky
(74) *Attorney, Agent, or Firm* — Richard C. Litman

(57) ABSTRACT

The smart lid for smart bolts and probes is an electronic sensor for use with a smart bolt or probe having a color indicator for indicating tension. The smart lid includes a color sensor that provides electrical data corresponding to light received from the color indicator of the smart bolt or probe, a microcontroller that receives electrical data from the color sensor and converts that data to a digital form and compares the data against at least one limit, and provides a digital indication wirelessly to a remote monitor if the at least one limit has been exceeded. In this fashion a warning or emergency condition can be indicated when the tension experienced by the smart bolt is too low or too high. The smart lid may include an electrical power source that scavenges electrical power from ambient electromagnetic fields (EMF) and stores the electrical power in a battery.

17 Claims, 4 Drawing Sheets

SMART LID FOR SMART BOLTS AND PROBES

BACKGROUND OF THE INVENTION

1. Field of the Invention

The present invention relates to mechanical fasteners and to electronic sensors for detecting failure of mechanical components, and particularly to a smart lid for smart bolts and probes that automatically detects failure of a smart bolt in a structure or machine and generates an alert for maintenance or emergency repair.

2. Description of the Related Art

Such structures as buildings, bridges, pipelines, petroleum plants, ships and aircraft must be robustly designed, carefully built and regularly inspected to prevent 'wear and tear' damage to components, such as bolts, from causing catastrophic failures. Even well designed and built structures will not last forever, so periodic inspection of bolts is often required to ensure structural integrity. As used herein, the terms "bolt" or "bolts" shall be taken to include any kind of bolt, including all tension-based bolts, screws, studs and fasteners.

Machines often have bolts with similar maintenance and inspection issues as structures. For example, failure of a bolt in a machine can cause delays and loss of productivity in both public and commercial enterprises. The maintenance of machinery constitutes a huge cost to industry. Some studies in Europe have shown the direct cost of maintenance often ranges between 4% to 8% of the total sales price. The indirect cost of maintenance issues, such as reduced quality and lost productivity, is likely to be at least that much. Unfortunately, bolts play a role in that in those maintenance issues and costs.

One aspect of dealing with the problem of bolt-related failure has been to ensure that the bolts were properly installed in the first place. When using bolted joints in industrial plants and mechanical systems, there often is some uncertainty regarding the desired amount of torque that should be applied, and how much corresponding preload is actually applied depends on the method of tightening selected, in part due to varying friction conditions. Insufficient preload, often caused by an inaccurate tightening method, is a frequent cause of bolted joint failure. While some design engineers appreciate the features and characteristics of the main methods employed to tighten bolts, whatever method is used to tighten a bolt, a degree of bolt preload scatter is to be expected, and hence a technique for failure monitoring of each bolt is desired. Furthermore, other applications include other types of failure criteria that also suggest local bolt monitoring.

One approach to dealing with preload variation and scatter has been the "smart bolt." For example, smart bolts, such as those manufactured by Stress Indicators Inc. of Gaithersburg, Md. 20877 (accessible by Internet at www.smartbolts.com, marketed under the name SmartBolts®, provide a visual indication (a dot on the bolt head that changes color according to the condition of the bolt) of the tension that a bolt is under in a central portion of the bolt ("smart bolts").

Some existing smart bolts are used in structures and industrial plants that have red dot, yellow dot, yellow dot then green dot, or other color combinations that turn black (or a different designated color) as the bolt is tightened. For example, the two-color (red/black) smart bolt from Stress Indicators Inc. will change from red to black as the bolt is sufficiently tightened. The three-color smart bolt from Stress Indicators Inc. will change from yellow to green as the bolt is optimally tightened, and then from green to black if the bolt is over-torqued. The color indicator in a smart bolt is also reversible, meaning that an optimally tightened bolt that becomes loose over time will change back to a color that indicates that it has not been sufficiently tightened.

Smart bolts provide an easily discernable visible indication that the smart bolt is properly tightened or not. This is even more important with some modern materials because internal damage in such materials can be very serious, but still leave little to no surface evidence, other than a smart bolt color indication. In all these cases, smart bolts provide a needed quick and accurate visual indication that something is wrong.

While smart bolts are a significant improvement over simple prior art bolts, structural and mechanical inspection by trained individuals, while necessary, is still both expensive and time-consuming. Even well-funded inspection programs can run into difficulties trying to inspect large numbers of widely scattered structures or machines because of the sheer magnitude of the task. For example, it is has been reported that there are roughly 600,000 bridges in the U.S. alone, and some tens of thousands are in need of repair or replacement. The sheer magnitude of the inspection task suggests mistakes in inspection have and will continue to occur.

Because the bolt inspection task is expensive, time-consuming, and subject to human error, it would be desirable to address these shortcomings. Thus, a smart lid for smart bolts and probes mitigating or solving the aforementioned problems is desired.

SUMMARY OF THE INVENTION

The smart lid for smart bolts and probes is an electronic sensor for use with a smart bolt or probe having a color indicator for indicating tension. The smart lid includes a color sensor that provides electrical data corresponding to light received from the color indicator of the smart bolt or probe, a microcontroller that receives electrical data from the color sensor and converts that data to a digital form and compares the electrical data against at least one limit, and provides a digital indication wirelessly through an antenna to a remote monitor if the at least one limit has been exceeded. In this fashion a warning or emergency condition can be indicated when the tension experienced by the smart bolt is too low, or in some embodiments, too low or too high. The smart lid may include an electrical power source that scavenges electrical power from ambient electromagnetic fields (EMF) and stores the electrical power in a battery. Alternatively, the smart lid may be powered by a previously charged battery. The smart lid uses a housing that is removably coupled to the smart bolt with a flexible, resilient retainer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The smart lid for smart bolts and probes uses a novel smart lid that can be removably attached to a smart bolt (or a probe). The smart lid uses a color sensor to perform automatic color detection of the central portion of the smart bolt that provides a color-coded tension indication and wireless transmission of the detected color-coded tension indication directly or indirectly through other smart lids to a computer for storage and analysis. The smart lid provides an automatic electronic process that eliminates the need for a manual inspection process, and uses electronic detection of color changes, eliminating subjective human judgments and producing greater uniformity in maintenance, inspection, and emergency detection procedures.

Figure 1:
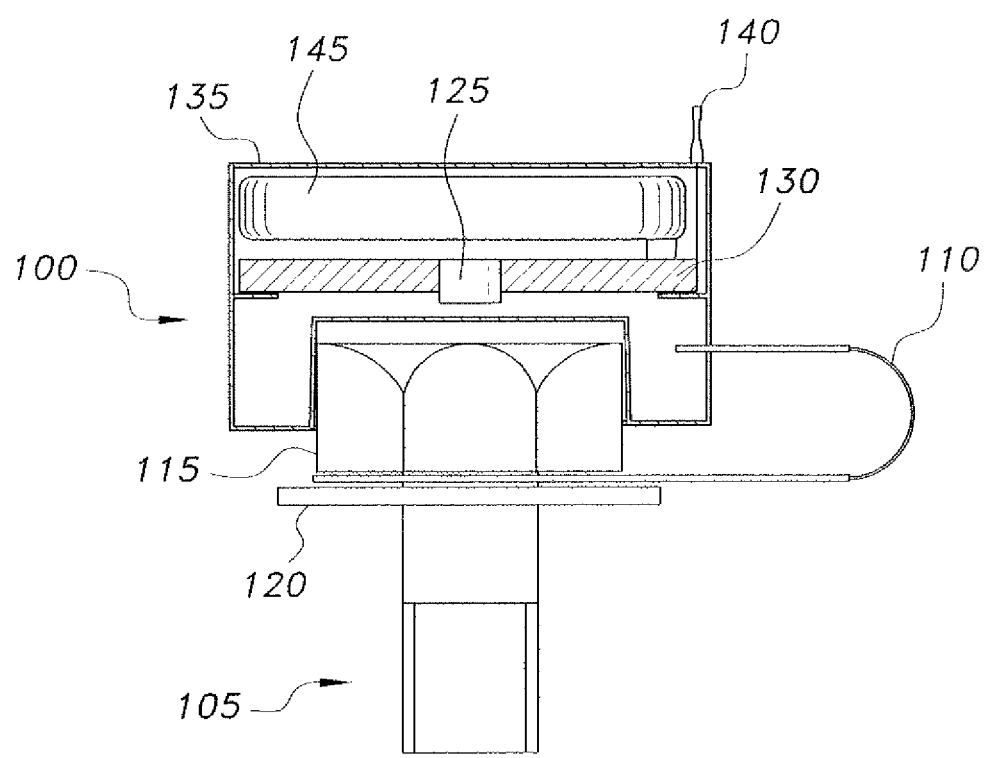
FIG. 1 is an environmental side view of a smart lid for smart bolts and probes according to the present invention, the lid being shown in section to show details thereof.

FIG. 1 shows a side view of a smart lid 100 for smart bolts 105 and probes mounted on top of a smart bolt. The smart lid 100 may also be used with smart probes, which are functionally similar to smart bolts in that they provide a visual indication of tension, even though the probe itself provides little or no binding effect between structural or mechanical elements, as a bolt would. In this fashion, the smart lid can be used for probes measuring displacement between any two points in a structure, such as the opti-mechanical indication of displacement described in U.S. Pat. No. 4,904,132, which is hereby incorporated by reference in its entirety.

Figure 3:
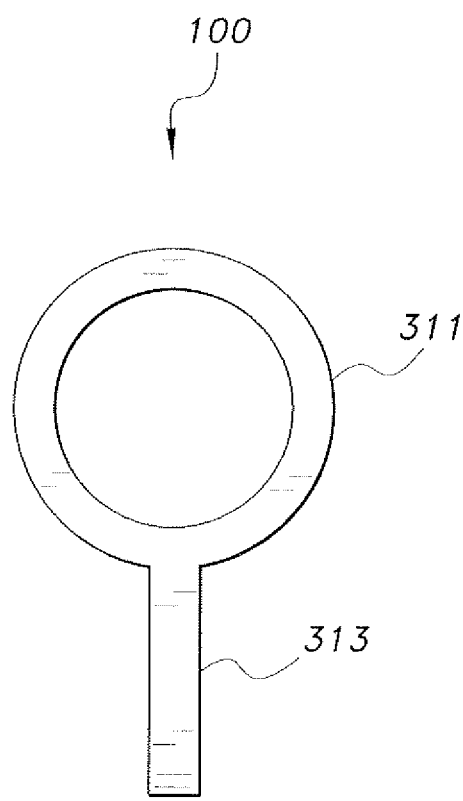
FIG. 3 is a top view of a flexible retainer spring for removably mounting the smart lid for smart bolts and probes of FIG. 1 to a bolt.

The smart lid 100 is physically coupled and tethered to the smart bolt 105 by a flexible retainer spring 110, as can be seen more clearly in FIG. 3. One end of the flexible retainer 110 contains an aperture through which the smart bolt 105 can be positioned so that the aperture is positioned between the head 115 of the smart bolt 105 and a washer 120. The opposite end of the retainer 110 is fixed to the lid 100. The retainer 110 may be made from spring steel, and may be biased to hold the lid 100 away from the head 115 of the bolt 105 when the lid 100 is uncapped from the bolt 105 to permit access with a tool for tightening or untightening the bolt 105.

The smart lid 100 is shown in FIG. 1 in a closed position, fitted around and capping the head 115 of the smart bolt 105, being retained by a friction fit. The smart lid 100 is not limited to any particular orientation, and can be physically and removably coupled to the smart bolt 105 when the smart bolt 105 extends upwards, downwards, sideways or in any other orientation.

The smart lid 100 contains a color sensor 125 for sensing the color indication provided by the smart bolt 105 corresponding to the amount of tension experienced by the smart bolt 105. The color sensor 125 converts the sensed color indication into a digital electronic format corresponding to the color of the smart bolt 105 indicator. The sensed color indication can be of single color, such as red, yellow, or green, or multiple colors, and can include a grayscale indication. The color sensor 125 can either include a small light source or work with ambient light passing through or around the smart lid 100 depending on the application environment the smart lid 100 is to be used in. The color sensor 125 is mounted on a printed circuit board (PCB) 130 in the smart lid housing 135. The smart lid housing 135 forms the primary exterior structure of the smart lid 100. However, different portions of the flexible retainer 110 extend both inside and outside of the housing 135, as shown in FIG. 1. Furthermore, an antenna 140 may extend outside the housing 135, or may remain entirely inside the housing 135, depending on the application environment. The housing 135 is preferably formed out of polyvinyl chloride (PVC) or another comparable plastic material, but is not limited to any particular material.

Figure 4:
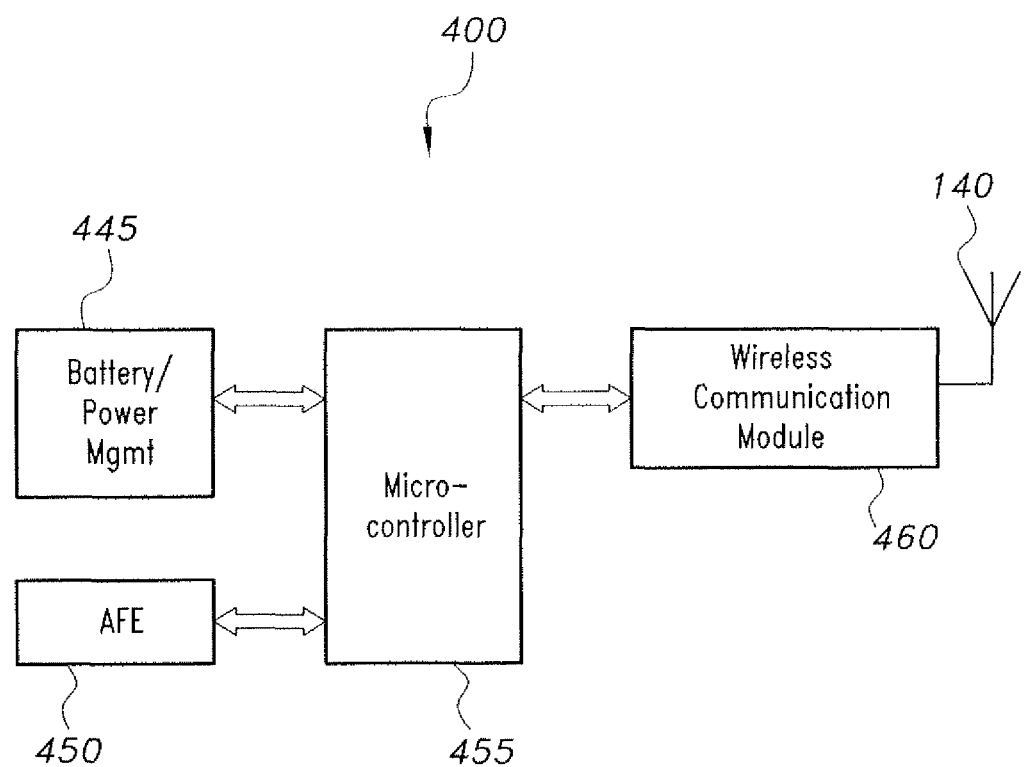
FIG. 4 is a block diagram of an electronic circuit for a smart lid for smart bolts and probes according to the present invention.

The PCB 130 physically and electrically supports the color sensor 125 that is mounted thereon, and supports the antenna 140 and a microcontroller 455 (shown in FIG. 4). The microcontroller 455 receives and processes signals from the color sensor 125, and converts those signals into an appropriate digital electronic format. The microcontroller 455 wirelessly transmits tension information in the appropriate digital electronic format, which may be encoded or encrypted for secure communications, corresponding to the sensed color indication from the color sensor through the antenna 140. While monitoring of the smart bolt 105 color indicator by the smart lid 100 is continuous, transmission of tension information can be continuous, periodic or event-driven, such as when the tension enters into a warning or emergency level. Typically the indicated tension enters a warning level, then an emergency level as tension drops below the optimal range, but corresponding warning and emergency levels above the optimal range can also be used if supported by the smart bolt 105 color indicator. The microcontroller 455 is programmed with the appropriate warning and emergency levels, as well as internal damage diagnostics and self-recovery features.

The tension information can take any form, including specifying a color mix (red-blue-green) and/or gray scale indications, or a simple warning/emergency indication that the tension is approaching or exceeding tension specifications, respectively. While under-tension is known to be the primary cause of structural or mechanical problems associated with bolts, over-tension can also be a problem and can also be reported by the smart lid 100.

The color sensor 125, antenna 140, and microcontroller 455 are powered by and suitable power source, which may optionally include an electromagnetic field (EMF) scavenging device 145, such as those known in the art, that convert ambient EMF (such as that emitted by radio station broadcasts) into small amounts of electrical power. The EMF scavenging device 145 includes a battery 445 to buffer and store energy for the microcontroller 455, color sensor 125 and wireless communications.

Figure 2:
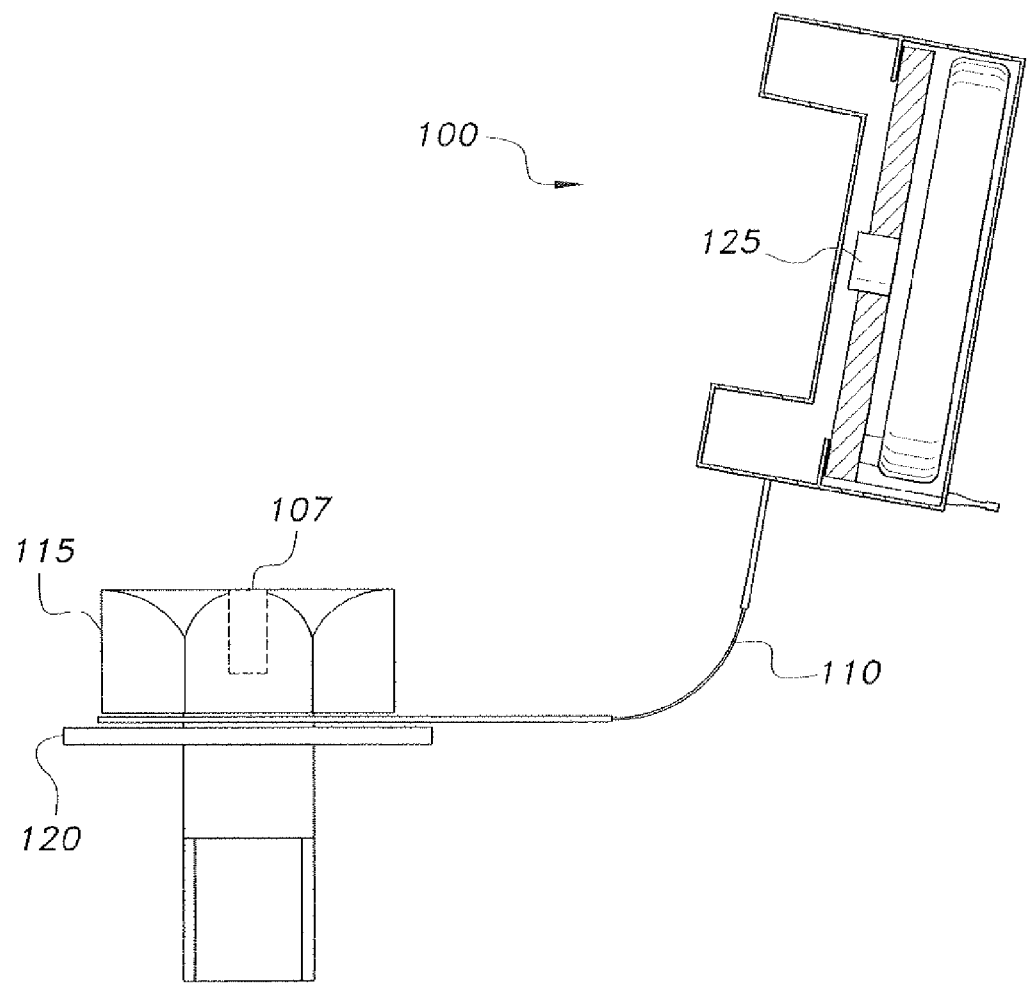
FIG. 2 is an environmental side view of a smart lid for smart bolts and probes according to the present invention, the lid being uncapped from the bolt head and tethered to the bolt by a retainer spring.

FIG. 2 shows the smart lid 100 uncapped from the head 115 of the smart bolt 105. As was the case in FIG. 1, in FIG. 2 the smart bolt 105 has its narrower, threaded portion positioned through the aperture of the flexible retainer 110 and the washer 120. The color indicator 107 on the smart bolt 105 is shown in phantom. When the smart lid 100 is in the closed position, as shown in FIG. 1, the color sensor 125 is correspondingly positioned directly above or adjacent to the color indicator 107. The arrangement in FIG. 2 is the same as shown in FIG. 1, other than the open position of the smart lid 100 and corresponding change (decrease) in deflection of the flexible retainer 110.

FIG. 3 shows a top view of the flexible retainer spring 110 for removably mounting the smart lid 100 for smart bolts and probes to the smart bolt 105. The flexible retainer spring 110 has an annular portion 311 defining an aperture adapted to receive the narrow (threaded) portion or shaft of the smart bolt 105, and an attached elongated tether portion 313 having an end adapted to be inserted partially into and fixed to the smart lid 100, thereby physically coupling the smart lid 100 to the smart bolt 105 and tethering the lid 100 to the bolt 105 in both the closed and open positions, or in any position in between. The flexible retainer spring 110 can be deflected between the closed and open positions without permanent deformation, as shown in FIG. 1 and FIG. 2, respectively.

FIG. 4 shows a block diagram of an electronic circuit 400 for implementing the smart lid for smart bolts and probes. The circuit 400 contains an analog front-end ("AFE") transducer 450 for interfacing signals from the color sensor 125 to the microcontroller 455. The AFE 450 electrically conditions the signals coming from the color sensor 125 prior to their conversion by the microcontroller 455 so that the signals are electrically compatible with the specified input ranges of the microcontroller 455. The microcontroller 455 supervises all the different operations of the circuit 400 for the smart lid 100. The microcontroller 455 is a standard, currently-available microcontroller, comprising a CPU, memory and peripheral circuitry. The microcontroller 455 is electrically coupled to a wireless communication module 460 using either a standard or proprietary communication standard. Alternatively, the microcontroller 455 can include internally any or all circuitry of the smart lid 100, including the wireless communication module 460. The microcontroller 455 preferably includes power savings or power management circuitry 445 and modes to reduce power consumption significantly when the microcontroller 455 is not active or is less active. The microcontroller 455 may contain at least one Analog-to-Digital Converter (ADC) channel for interfacing to the AFE 450.

The battery/power management module 445 preferably includes the electromagnetic field (EMF) scavenging device 145, but can alternatively run off of previously stored electrical power from the battery alone. The battery/power management module 445 powers all the circuitry in the smart lid 100, including the color sensor 125, AFE 450, microcontroller 455, wireless communication module 460, and antenna 140. Even though the smart bolt 100 is preferably powered by continuously harvesting RF energy, it is beneficial to minimize power consumption. To minimize power consumption, the various tasks performed by the circuit 400 should be repeated no more often than necessary under the circumstances.

Color information from the smart bolt 105 and other information from the microcontroller 455 is preferably transmitted wirelessly through a wireless communication module 460 and antenna 140. As stated above, the wireless communication component can use standard or proprietary communication protocols. Smart lids 100 can also communicate with each other to relay information about the current status of the structure or machine and the smart lids 100 themselves. In each smart lid 100, the transmission of this information may be scheduled to be transmitted periodically. The smart lid 100 has a data storage medium (memory) to store color indication and internal status information, such as power levels, while the communication component is in an OFF state between transmission periods. On the other hand, once the communication commences in the ON state, the microcontroller 455 can execute the following tasks:

1. Neighbor discovery: in this task each smart bolt 100 sends a beacon identifying its location, capabilities (e.g. residual energy), status. 2. Cluster formation: cluster head will be elected based on the findings in (1). The cluster children communicate directly with their cluster head (CH). 3. Route discovery: this task interconnects the elected cluster heads together and finds the route towards the sink smart lid (node) so that minimum energy is consumed. 4. Data transmission: the microcontroller processes the collected color data and based on the adopted data dissemination approach, the smart lid 100 will do one of the following. (a) Transmit the data as is without considering the previous status; or (b) transmit the data considering the previous status. Here we can have several scenarios, which include: (i) transmitting the data if the change in reported tension exceeds the warning or emergency levels; and (ii) otherwise, do not transmit.

It is to be understood that the present invention is not limited to the embodiments described above, but encompasses any and all embodiments within the scope of the following claims.

We claim:

1. A smart lid for use with a smart bolt having a color indicator for indicating tension, the smart lid comprising:
    a housing adapted for removably capping a bolt head of the smart bolt;
    a color sensor disposed in the housing, the color sensor being configured for producing an electrical signal corresponding to the wavelength of light received from the color indicator of the smart bolt, the housing being adapted for supporting the color sensor above the color indicator;
    a microcontroller disposed in the housing, the microcontroller being electrically connected to the color sensor and receiving the electrical signal from the color sensor, the microcontroller being configured for comparing the electrical signal against at least one tension limit and providing a digital notification signal when the at least one limit has been exceeded;
    a wireless communication module and an antenna connected to the microcontroller, the wireless communication module wirelessly transmitting the digital notification signal through the antenna.

2. The smart lid according to claim 1, wherein the electrical data includes data corresponding to a single color component.

3. The smart lid according to claim 2, wherein the single color component is red.

4. The smart lid according to claim 1, wherein the microcontroller is programmed to send the notification signal to the wireless communication module periodically for periodic transmission of the digital notification signal.

5. The smart lid according to claim 1, wherein the data includes data corresponding to a plurality of color components.

6. The smart lid according to claim 1, wherein the plurality of color components comprise yellow and green.

7. The smart lid according to claim 1, wherein said color sensor is configured to provide gray-scale measurements.

8. The smart lid according to claim 1, wherein the housing is made from PVC.

9. The smart lid according to claim 1, further comprising a power management module disposed in the housing, the power management module comprising a battery and a circuit for scavenging power from ambient electromagnetic fields to recharge the battery.

10. The smart lid according to claim 1, further comprising a retainer spring having an annular portion adapted for being secured under the head of the smart bolt and an elongated strip extending from the annular portion, the elongated strip having an end fixed to said housing, whereby the housing is tethered to the smart bolt.

11. The smart lid according to claim 1, further comprising an analog front end (AFE) circuit disposed between said color sensor and said microcontroller, the AFE circuit being configured for electrically conditioning the analog electrical data from the color sensor.

12. A smart lid for use with a probe having a color indicator for indicating tension, the smart lid comprising:
    a housing adapted for attachment to the probe;
    a color sensor disposed in the housing, the color sensor being configured for producing an electrical signal corresponding to the wavelength of light received from the color indicator of the probe, the housing being adapted for supporting the color sensor above the color indicator;

a microcontroller disposed in the housing, the microcontroller being electrically connected to the color sensor and receiving the electrical signal from the color sensor, the to microcontroller being configured for comparing the electrical signal against at least one tension limit and providing a digital notification signal when the at least one limit has been exceeded;

a wireless communication module and an antenna connected to the microcontroller, the wireless communication module wirelessly transmitting the digital notification signal through the antenna.

13. The smart lid according to claim 12, further comprising a power management module disposed in the housing, the power management module comprising a battery and a circuit for scavenging power from ambient electromagnetic fields to recharge the battery.

14. A smart bolt, comprising:

a bolt having a head, a shaft, and a tension indicator forming a color dot on the head of the bolt, the color dot changing color to indicate when the bolt is undertorqued, properly torqued, and overtorqued;

a housing removably capping the head of the bolt;

a color sensor disposed in the housing, the color sensor being aligned with the color dot when the housing is attached to the head of the bolt, the color sensor generating an electrical signal corresponding to the color of the dot;

a microcontroller disposed in the housing, the microcontroller being electrically connected to the color sensor and programmed to compare the electrical signal to color levels corresponding to the torquing of the bolt, the microcontroller being programmed to output a digital notification signal when comparison of the electrical signal shows the bolt to be undertorqued or overtorqued; and a wireless communication module disposed in the housing and an antenna connected to the wireless communication module, the wireless communication module being connected to the microcontroller and configured to transmit the digital notification signal to a remote monitoring site.

15. The smart bolt according to claim 14, further comprising a power management module disposed in the housing, the power management module comprising a battery and a circuit for scavenging power from ambient electromagnetic fields to recharge the battery.

16. The smart bolt according to claim 14, further comprising a retainer spring having an annular portion securable under the head of the smart bolt and an elongated strip extending from the annular portion, the elongated strip having an end fixed to said housing, whereby the housing is tethered to the smart bolt.

17. The smart bolt according to claim 14, further comprising an analog front end (AFE) circuit disposed between said color sensor and said microcontroller, the AFE circuit being configured for electrically conditioning the analog electrical data from the color sensor.

* * * * *